Patented Dec. 12, 1933

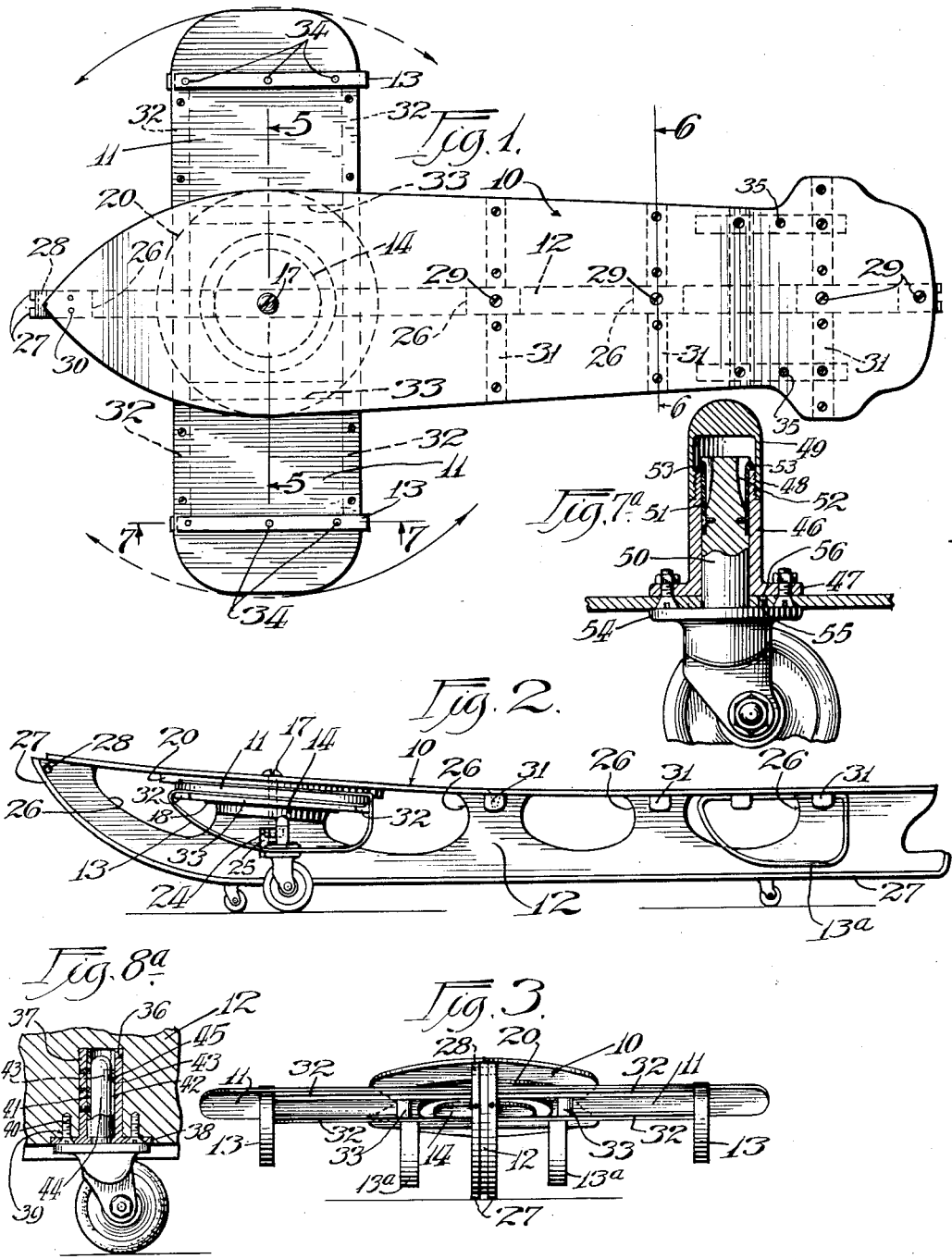

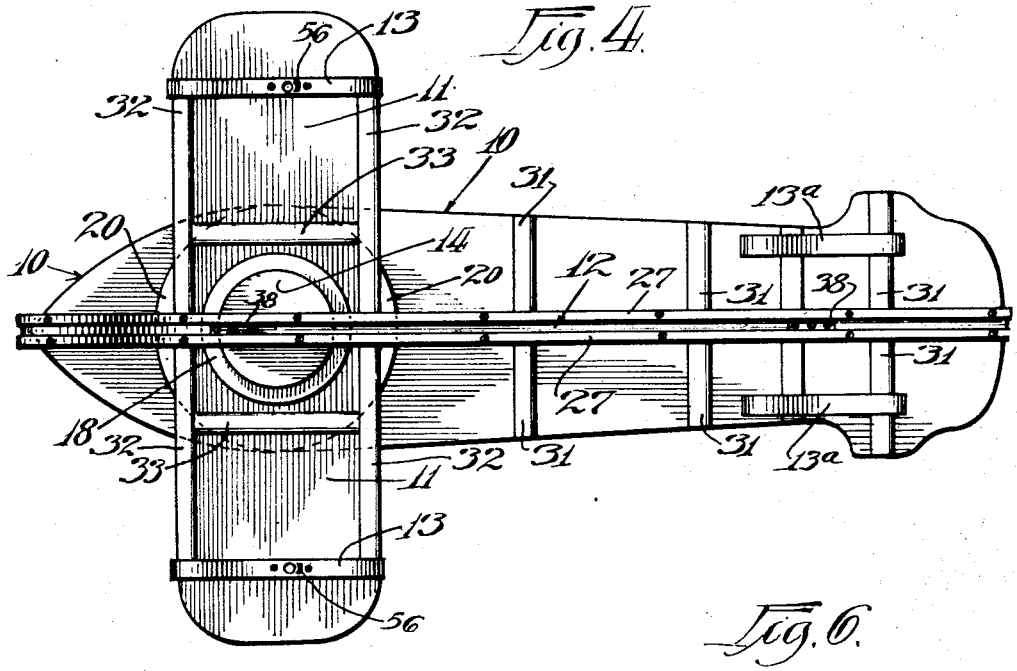
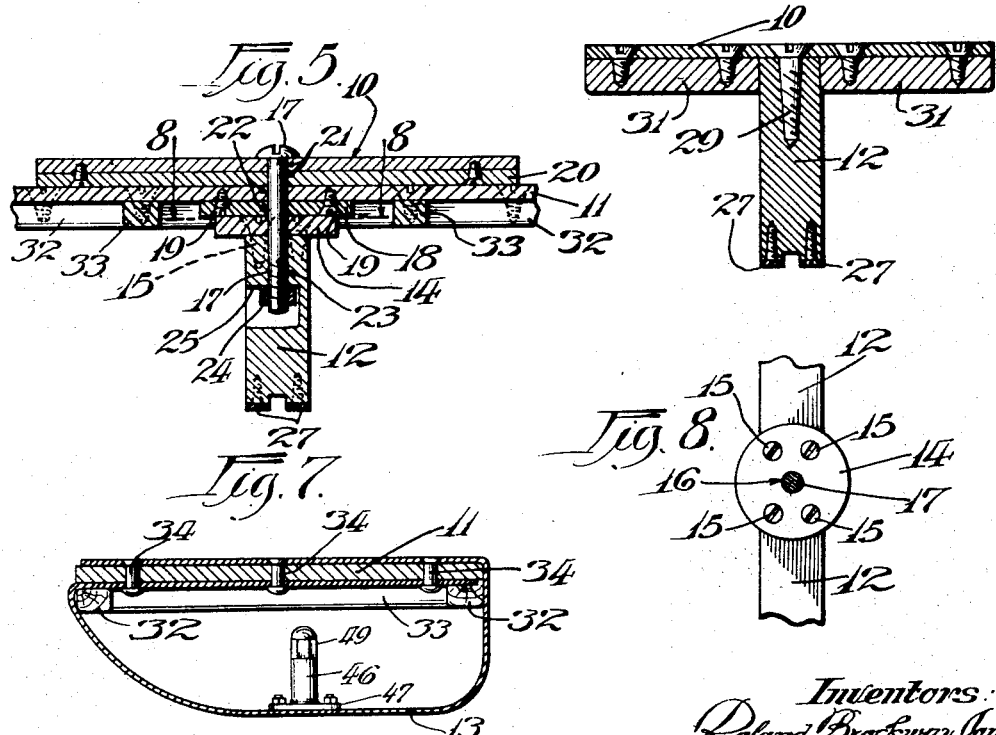

1,938,701

UNITED STATES PATENT OFFICE 1,938,701

AMUSEMENT DEVICE

Roland Brockway Jones and Cyrus Frederick Jones, Oregon, Ill.

Application February 25, 1931. Serial No. 518,202

7 Claims. (Cl. 280—8)

This invention relates to amusement devices, and more particularly to what might be termed a coaster and-or- sled coaster. The device is adapted to be used upon ice and snow, and by adding the proper parts, is adapted to be used on concrete surfaces and the like.

Another object is the provision of a device of the character described which, while requiring some practice and skill before one may successfully use it, will, nevertheless, after some practice, provide a source of wholesome amusement.

Another object is the provision of a device which has few working parts, is economical to manufacture and maintain, and is well fitted for the purposes for which it may be used.

Other objects will appear more fully in the details herein set forth, when taken in connection with the accompanying drawings, in which:

Fig. 1 is a top plan view of the device showing certain underlying structures in dotted lines;

Fig. 2 is a side elevational view of the device equipped with casters or rollers;

Fig. 3 is a front elevational view of the device without casters or rollers, and adapted to be used as a sled coaster;

Fig. 4 is a bottom plan view;

Fig. 5 is a detail view in section, taken substantially on the line 5—5 of Fig. 1, and shows particularly the pivot and bearing members and their arrangement in our device;

Fig. 6 is a detail view in section, taken substantially on the line 6—6 of Fig. 1, and shows more particularly the method of attachment of what might be termed a runner member to the main body portion;

Fig. 7 is a detail view in section, taken substantially on the line 7—7 of Fig. 1, and demonstrates more clearly the construction of what might be termed the auxiliary runner of our device, and also shows the socket for the caster member;

Fig. 8 is a detail view showing the bearing disk upon which the transverse member or wing is adapted to rest upon the main runner;

Fig. 7—A is a detail view of the socket and caster construction which may be used on the auxiliary runner of our device; and Fig. 8—A is a detail view of a type of socket and caster which may be used on the main runner of our device.

Referring now to the drawings which illustrate one embodiment of our invention, our device may be provided with a main body portion 10, transverse member or wing 11, a main runner 12, and auxiliary runners 13 and 13—A.

As illustrated in Fig. 1, and the present illustrated embodiment, wing 11 is pivotally mounted transversely of the main body portion 10, and is mounted toward the forward end of said main body portion. As illustrated in Fig. 8, bearing disk 14 is secured to the upper edge of main runner 12 by means of screws 15, and is also provided with an annular opening 16 for the passage of bolt 17 which secures the main runner, transverse wing member, and main body portion together.

As illustrated more clearly in Figs. 3, 4, and 5, transverse wing member 11 may be provided with bearing disk 18 which is secured to wing member 11 by screws 19, and is adapted to rest on bearing disk 14. Beneath main body portion 10 is provided bearing disk 20 which is adapted to rest on transverse wing member 11, and by thus separating the two members, is well adapted to reduce friction to some extent.

As mentioned before, body portion 10, wing member 11, and main runner member 12, are secured together by means of bolt 17 which passes through slot 21 of the main body portion, slot 22 of wing member 11, slot 23 of runner member 12, and bolt 17 is finally engaged by nut 24 in enlarged recess 25.

Main runner 12 may be made of wood, as also may be the main body portion and the wing member, and may be provided with cutouts 26 and metal runner strips 27, which are placed parallel to each other on the lower face or edge of main runner 12. Toward the forward end of the main runner 12 is provided slot 28 for use in towing our device by a rope or similar means.

Main body portion 10 may be secured to main runner 12 by screws 29, bolt 17 previously mentioned, and screws 30 toward the forward end of said body portion. Transversely of main body portion 10 are secured transverse braces 31 which may fit tightly against main runner 12 at an angle of 90 degrees; this construction affords a rigid brace at this point, and also gives additional strength to the main body portion throughout its width.

Transverse wing member 11 may be provided with longitudinal braces 32, transverse braces 33, and bearing disk 18, previously mentioned. Transverse braces 33 are adapted to form tight-fitting engagement with the longitudinal braces 32 in order to effect a rigid bracing of wing member 11. To wing member 11 may be secured auxiliary runners 13 by means of rivets 34. Auxiliary runners 13 may be made by passing a metal strip partially beneath wing member 11, longitudinal braces 32, then bending the strip downwardly and backwardly, thence upwardly, and over the top of wing member 11; this method of manufacture gives added strength to the runner and also to the wing member 11. Wing member 11 may be rounded at its ends in order to eliminate sharp corners, and main body portion 10 may be treated in the same manner.

Rear or auxiliary runners 13—A may be made from a single piece of strap metal bent into the shape illustrated in the drawings, passed between transverse braces 31 and body portion 10, and fastened by countersunk rivets 35.

Main runner 12 may be provided with an annular slot 36 for the reception of outer caster sleeve 37, illustrated in Fig. 8—A. Caster sleeve 37 may be made from a piece of cylindrical metal having projecting lugs 38 provided with screw holes 39 and adapted to receive countersunk screws 40. Lugs 38 are adapted to seat between main runner strips 27 as illustrated in Fig. 4. Inside the sleeve 37 may be placed inner sleeve 41, which is made of spring metal, and attached thereto by bolts or by spot welding. Inner sleeve 41 may be provided with a longitudinal slot 42 and arcuate transverse slot 43.

Caster shaft 44 is provided with projecting stud 45 which is adapted to enter longitudinal slot 42, and by being thrust upwardly will cause the sides of the slot to give outwardly in order to allow the shaft to be inserted its entire length. When stud 45 reaches arcuate slot 43, the inner sleeve springs back to its original size and holds shaft 44 in position. Arcuate slot 43 is adapted to control the turn of shaft 44 and limit it to approximately 30 degrees. When it is desired to remove the caster from the runner, it is necessary only to place stud 45 in proper alignment, pull downwardly, thus spreading longitudinal slot 42, and permitting the caster to be removed entirely.

For the auxiliary runners mounted on transverse wing member, we have provided a somewhat modified caster socket. Sleeve 46 may be provided at its lower end with lugs 47, and at its upper end with a threaded portion 48 for the engagement of the threads of cap 49. Caster shaft 50 may be provided with spring tongues 51 seated in appropriate recesses, and may also be cut away as illustrated at 52 to permit the tongues to be moved inwardly and toward each other. At their upper extremities spring tongues 51 may be provided with shoulders 53, which are adapted to engage the sides of sleeve 46 when shaft 50 is inserted its entire length in the sleeve. Caster bearing disk 54 may be provided with a stud 55 which is adapted to seat in arcuate slot 56 of runners 13, and thus limit the turn of the caster in sleeve 46; however, the caster may be turned through an angle of approximately 30 degrees, as the casters in the main runner may be turned. When it is desired to remove the casters from runners 13, it is necessary only to remove cap 49, press tongues 51 toward each other, push downwardly, and pull the caster from the sleeve. Cap 49 may be then replaced.

As hereinbefore stated, our device may be used upon snow or ice, and by adding the proper parts, may be used on concrete and like surfaces; it is adapted for use either in coasting down hills or upon the level ground. If the device is to be used upon level ground, one way of using it is to run, dive down upon the main body portion 10, and, of course, for coasting down hills the start may be made in the same manner. If the device is to be used upon concrete and like surfaces, the casters are affixed in their proper sockets as described.

If the device is to be used upon snow and ice, the main object of the user is to balance himself entirely upon main runner 12. It can be seen that this may be quite difficult, and may take a considerable amount of practice in order that the user may acquire skill in achieving his purpose. However, auxiliary runners 13 and 13—A will give aid to the user when he loses his balance, although this method of operation will ordinarily be less satisfactory to one than when the entire weight is balanced on runner 12, inasmuch as distance and speed are two objectives, and greater speed and distance may be attained when the entire weight is balanced on runner 12. As one means of aiding the maintaining of a proper balance, the cutouts 26 of runner 12 are adapted to reduce wind resistance to a large extent.

If the user desires to be pulled or towed by another individual, or by motive power of some character, he may attach a rope through slot 28 of runner 12.

If the one using the device desires to turn either to the right or to the left, it is necessary only to make the proper shift of the weight from one side of the device to the other, and turn the wing in an appropriate manner; it can be readily seen that when the weight is shifted, the auxiliary runner on the side to which the weight is shifted may be brought into contact with the surface of the ice or snow.

While we have illustrated and described one form of construction of our device, it is to be understood that changes and variations may be made therein without departing from the spirit or sacrificing the advantages of the device, and we wish to avail ourselves of variations which come within the scope of our invention.

Having thus described our invention, what we claim as new and desire to secure by Letters Patent is:

1. A device of the character described comprising a runner member, a main body member above and secured to said runner member, a wing member arranged pivotally and transversely of said runner member and said main body member, said wing member being provided with an auxiliary runner, said auxiliary runner being of less depth than said first mentioned runner member.

2. A device of the character described comprising a runner member, a main body member above and secured to said runner member, and a wing member arranged transversely of said runner and said body porton and secured pivotally to said runner member and said main body member, said wing member being mounted between said runner and said main body member.

3. A device of the character described comprising a runner member, a main body member above and secured to said runner member, and a wing member arranged transversely of said runner member and said main body member and provided with runners, said runner member and said wing member runners being provided with caster members, said wing member runners being adapted ordinarily to rest in a horizontal plane of greater elevation than the plane of said runner member.

4. A device of the character described comprising a runner member, a main body member above and secured to said runner member, and a wing member arranged transversely of said runner member and said main body member and provided with runners, said runner member and said wing member runners being provided with caster members, the shafts of said caster members being adapted to turn through an angle less than 180 degrees.

5. A device of the character described, comprising a body member, a runner member substantially longitudinally centrally disposed thereof and secured to said body member, a wing member arranged transversely of said runner member and body member, said runner member being provided with caster members the shafts of which have a turning radius limited to approximately 30°.

6. A device of the character described, comprising a runner member, a unitary main body member above and secured to said runner member, having a wing member arranged transversely of said runner and said body member and secured pivotally to said runner member and said main body member.

7. A device of the character described, comprising a runner member, a unitary main body member above and secured to said runner member, and a wing member arranged transversely of said runner member and said main body member and secured pivotally to said runner member and said main body member, said runner member being disposed centrally longitudinally of said main body member.

ROLAND BROCKWAY JONES.
CYRUS FREDERICK JONES.